United States Patent Office 3,488,878
Patented Jan. 13, 1970

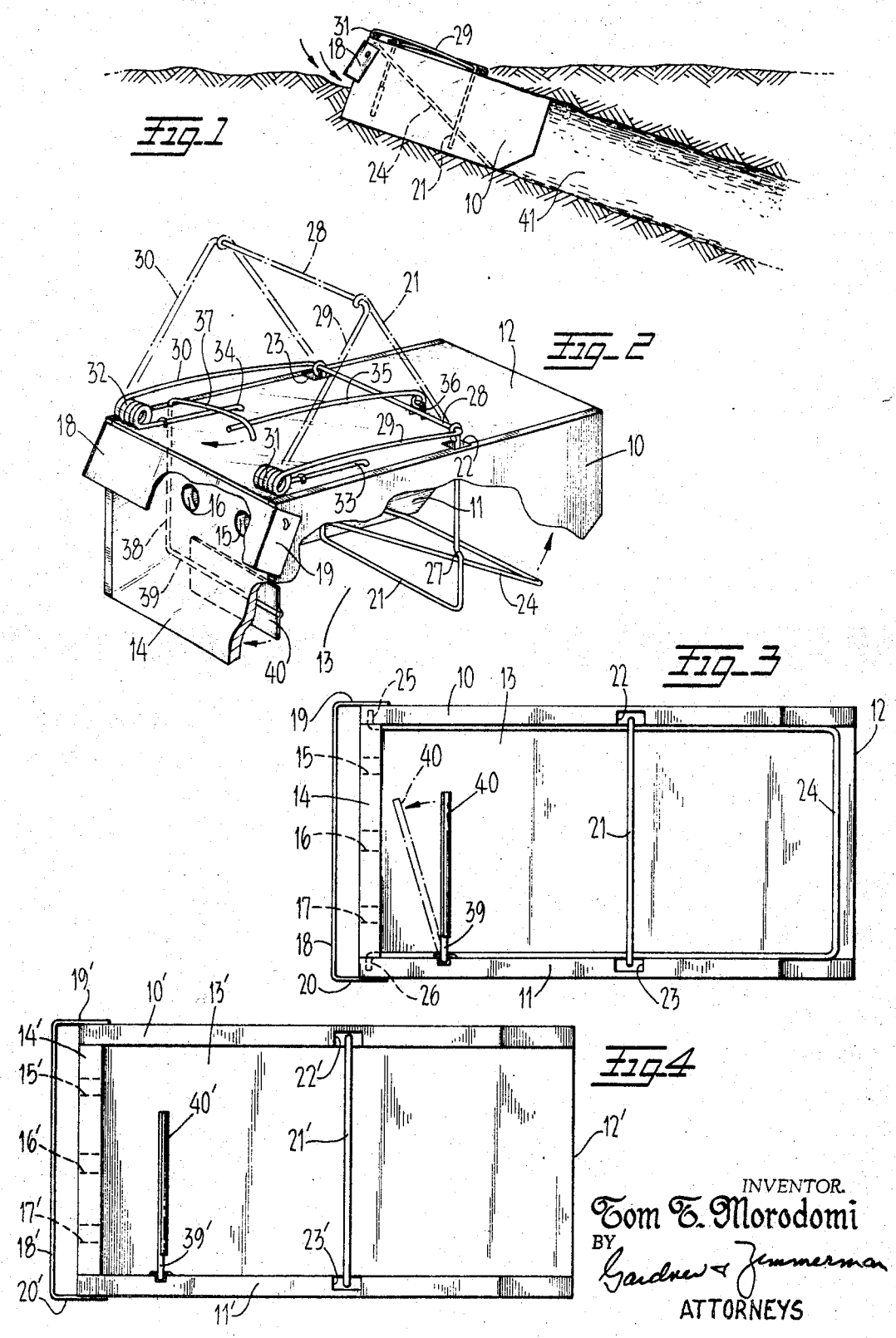

3,488,878
GOPHER TRAP
Tom T. Morodomi, 242 Boyd Road,
Pleasant Hill, Calif. 94523
Filed Oct. 17, 1968, Ser. No. 768,410
Int. Cl. A01m 23/26
U.S. Cl. 43—86                           10 Claims

ABSTRACT OF THE DISCLOSURE

A trap adapted to be positioned along an underground gopher run for trapping a gopher moving therethrough. The trap includes a casing providing a chamber therewithin substantially closed at one end and open at its other end to establish communication with such run. Clamp structure within the chamber is spring biased toward a closed or sprung position and is releasably retained in its open or set position by trigger structure adapted to be actuated by movement of a gopher into the chamber. The closed end of the chamber is provided with ventilation openings therethrough which permit fresh air to enter the chamber, and such openings are optically shielded to minimize the passage of light therethrough into the chamber, thereby making the source of light appear more distant.

---

This invention relates to a trap for catching relatively small animals and, more particularly, to a trap for exterminating earth-boring animals such as gophers.

Gophers often create considerable damage in gardens which makes their extermination desirable, but, unfortunately, they are difficult to locate since their movements are generally concealed within the ground. As a result, various devices and techniques have been employed heretofore in an effort to rid gardens of gophers including traps, gases, and poisons; but none of such prior procedures have been completely satisfactory.

It has now been found that gophers instinctively tend to close any opening into their underground runs by pushing earth toward the opening to close the same; and it has also been found that gophers tend to investigate the source of any fresh air entering their runs. Premised on these findings, an object, among others, of the present invention is to provide an improved trap utilizing such habits of gophers as a means for inducing the same into the trap. Another object is that of providing an improved gopher trap as described which is adapted to be placed along a gopher run and is characterized by admitting fresh air thereinto while obscuring the admission of light to the run thereby tending to make the source of such light appear more remote so as to induce a gopher to advance into the trap. A further object is in the provision of a gopher trap having a casing providing a chamber therein closed at one end and open at its other end so as to communicate therethrough with a gopher run, and which trap is equipped both with spring-loaded clamp members located within the chamber and with ventilation openings through the closed end thereof shielded so as to obscure the passage of light therethrough, the condition of the trap whether set or sprung being readily observed from the outside or from above ground. Additional objects and advantages of the invention, especially as concerns particular features and characteristics thereof, will become apparent as the specification develops.

Embodiments of the invention are illustrated in the accompanying drawing, in which:

FIGURE 1 is a side view in elevation of a trap embodying the invention, shown in position adjacent the end of a gopher run;

FIGURE 2 is a broken perspective view of the trap;

FIGURE 3 is a bottom plan view; and

FIGURE 4 is a bottom plan view of a modified trap.

The trap illustrated includes a casing having transversely spaced side walls 10 and 11 interconnected along the upper edges thereof by a top wall 12 and defining a chamber 13 open at one end and closed at its other end by an end wall 14. The side walls, top wall and end wall are interconnected so as to form a substantially rigid casing structure, and they may be constituted of any suitable material an example of which is wood. The end wall 14 is provided adjacent the upper edge thereof with a ventilation opening defined by a plurality of transversely spaced apertures, there being three shown, numbered 15, 16 and 17.

The ventilation opening communicates with the chamber 13 and is adapted to admit fresh air thereinto when the trap is in the position of use shown in FIGURE 1. However, in order to obstruct the opening as respects passage of light therethrough, means are provided for such purpose and in the particular trap illustrated take the form of shade structure 18 that overhangs the apertures 15 through 17. The shade structure 18 may be formed of metal and extends downwardly and outwardly in overhanging relation with the ventilation opening, and it may be turned inwardly at its ends (as shown at 19 and 20) so as to project along the respectively associated side walls 10 and 11 to which such ends are secured by nails or the like.

The trap includes clamp structure located within the chamber 13 and operative to snare or grip a gopher entering the same to confine him therewithin against the underside of the top wall 12. The clamp structure includes a generally U-shaped clamp member 21 having a lower crossbar formed integrally with transversely spaced, upwardly extending legs that pass through openings 22 and 23 provided therefor in the top wall 12. The clamp structure further includes an elongated clamp member 24 also of generally U-shaped configuration that extends longitudinally along the compartment 13 and is supported therewithin for swinging movements about an axis located at the end wall 14 and defined by the outwardly turned end portions 25 and 26 of the spaced apart legs of such member, and which outwardly turned portions are respectively received within openings provided therefor in the side walls 10 and 11 of the casing structure.

The U-shaped clamp member 21 is movable along a path intersecting or traversing the plane of the top wall 12, and such movement is between a lower open or "set" position shown in FIGURE 2, and an upper closed or "sprung" position in which the crossbar of the member 21 is in substantial engagement with the undersurface of the top wall 12 (or with a gopher pinned thereagainst). The elongated clamp member 24 is similarly movable between a lower open or set position shown in FIGURE 2 and an upper closed or sprung position adjacent the top wall 12.

The clamp member 24 is controlled by the U-shaped clamp member 21 and, in this respect, each of the upwardly extending legs of the U-shaped clamp member 21 is deformed therealong, as shown at 27, to provide an abutment a spaced distance above its crossbar. The elongated clamp member 24 extends through the clamp member 21 so that the respectively adjacent spaced legs of each are in substantially contiguous relation. Accordingly, when the U-shaped clamp member 21 is displaced downwardly into the open position thereof shown in FIGURE 2, each abutment 27 engages the adjacent leg of the elongated clamp member 24 so as to displace the same into its open position shown in FIGURE 2. Conversely, when the U-shaped clamp member 21 is displaced upwardly toward its closed position, its crossbar engages the spaced legs of the clamp member 24 to carry it upwardly toward abutment with the undersurface of the top wall 12.

Spring means are provided in association with the clamp structure to resiliently bias the same toward its closed position, and such spring means includes a connector bar 28 extending between the spaced legs of the clamp member 21 above the top wall 12 and coupled to the clamp member as by means of passing through eyes provided at the upper ends of such legs (the eyes being formed as by bending the end of each leg into a closed loop). The bar 28 is formed integrally at each end thereof with elongated arms 29 and 30 provided by a pair of coil springs 31 and 32 respectively equipped with end arms 33 and 34 that extend along the top wall 12 and are anchored thereto by staples or U-shaped nails (as shown in FIGURE 2), and may be further confined in position therealong by having their end portions turned downwardly so as to seat within apertures provided for this purpose in the top wall.

The springs 31 and 32 are formed so that they continuously urge the legs 29 and 30 thereof upwardly and away from the top wall 12 toward the positions thereof shown by broken lines in FIGURE 2. Evidently, the openings 22 and 23 must be sufficiently large to enable the spaced legs of the U-shaped clamp member 21 to be displaced longitudinally while being moved toward the closed broken-line positions thereof under the biasing force of the springs 31 and 32. Further, the inter-connection of the bar 28 of the spring means and legs of the clamp member 21 advantageously permit relative angular displacements therebetween while moving between their closed and open set positions, and the described inter-connection therebetween accommodates this motion.

Set-release structure is included to maintain the clamp structure in its open set position against the biasing force of the springs 31 and 32, and such structure takes the form of a flap wire 35 pivotally secured to the top wall 12 along the upper surface thereof as by means of a U-shaped staple 36 affixed thereto, and to which the flap wire is attached by being bent into a closed loop passing the staple therethrough. The flap wire is adapted to be brought over the connector bar 28 (as shown in FIGURE 2), and to hold the same downwardly in the set position shown by a trigger structure that includes a holder wire 37 extending generally along the plane of the top wall 12 and formed integrally with a pivot wire 38 extending downwardly through the top wall and turned laterally at its lower end, as shown at 39, so as to extend in substantially parallel relation with the holder wire 37.

The end portion 39 of the pivot wire is located within the chamber 13 and is equipped with a relatively flat plate 40 that extends transversely of the chamber 13 when the trap is set (as shown in FIGURE 2), and is adapted to be displaced toward the end wall 14 into the broken-line position shown in FIGURE 3 by movement of the gopher within the chamber 13. Such displacement of the plate 40 springs the trap by releasing the holder wire 37 from the flap wire 35, whereupon the springs 31 and 32 snap the clamp structure comprising the clamp members 21 and 24 into their closed or sprung positions.

In use of the trap, it is placed along an underground gopher run (as shown in FIGURE 1) generally adjacent the opening thereof through the surface of the earth. The trap may be set after being so positioned by pressing the connector bar 28 of the spring means downwardly until the arms 29 and 30 of the spring means are generally adjacent the top wall 12 which places the clamp members 21 and 24 in their open position (as shown in FIGURE 2). The flap wire 35 is then brought over the connector bar 28 and the holder wire 37 swung into overlying relation with the end of the flap bar which constrains the clamp structure comprising the clamp members 21 and 24 in their open or set position against the biasing force of the spring means.

Prior to placing the trap in the opening of the gopher run, the ground is excavated somewhat so as to enable the trap to be placed therein; and after the trap is set, it is advantageously moved back and forth to cause the ground to cover the clamp wires 21 and 24 since gophers generally dislike crossing metal members. Loose earth is then packed around the edges of the trap to carefully cover all cracks and holes except for the apertures 15 through 17 because if such apertures are plugged the gopher may think that the run is closed and will thereby avoid the trap. In this respect, the openings 21 and 23 should be covered, and when satisfied that no light or air enters the trap except through the apertures 15, 16 and 17, the holder wire 37 should be moved very close to the end of the flap wire 35 so as to "hair-trigger" the trap.

Since fresh air can enter the chamber 13 and run 41 through the ventilation opening comprising the apertures 15 through 17, any gopher within the run is induced to investigate the source of such ventilation. The shield 18 prevents light from directly entering the chamber 13 through the ventilation opening, with the result that such gopher is made to believe that the source of fresh air is at a more distant point, whereupon he enters the chamber 13 and is caught upon actuation of the trigger as a consequence of his displacing the plate 40 either by direct contact therewith or by displacing earth thereagainst. If the trap is sprung, this is readily evident by observation because the spring means and connector bar 28 thereof will be displaced upwardly into a position approximating the broken-line location thereof shown in FIGURE 2.

A modified form of the invention is shown in FIGURE 4, and it corresponds to the trap heretofore described in all essential respects except that the elongated clamp member 24 has been completely omitted and, therefore, the spaced legs of the U-shaped clamp member 21 need not have the deformations 27 formed therealong. In view of the otherwise identical correspondence of the modified trap with the embodiment heretofore considered, the illustrated components thereof are denoted with the primed form of the numerals used to identify the components of the trap illustrated in FIGURES 1 through 3, and no further description of the modified trap need be presented.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

I claim:

1. A trap for a gopher or the like, comprising a casing providing a chamber therein substantially closed at one end and open at its other end so as to establish communication therethrough with an underground gopher run, clamp structure within said chamber movable between an open set position and a closed gopher-snaring sprung position, spring means connected with said clamp structure for resiliently biasing the same toward the closed position thereof, set-release structure selectively movable between a set position in which said clamp structure is maintained in its open position and a release position in which said clamp structure is sprung and snaps toward the closed position thereof under the resilient force of said spring means, said set-release structure including a trigger within said chamber intermediate the closed end thereof and said clamp structure so as to be actuated by the movement of a gopher within said chamber, the closed end of said chamber being provided with ventilation openings, and means obstructing the admission of light into said chamber through said ventilation openings.

2. The trap of claim 1 in which said casing has spaced apart side walls, a top wall, and an end wall defining the closed end of said chamber, said ventilation openings being in said end wall, and said means for obstructing the admission of light through said openings comprising shade structure overhanging the same and secured to said casing.

3. The trap of claim 1 in which said casing has spaced apart side walls, a top wall, and an end wall defining the closed end of said chamber, said clamp structure comprising a generally U-shaped member having spaced apart legs slidably movable through said top wall and connected thereabove with said spring means.

4. The trap of claim 3 in which said spring means includes a connector wire extending between the spaced legs of said U-shaped member above said top wall, and in which said set-release structure includes a flap wire pivotally secured to the top wall of said casing and extendable over said connector wire to releasably maintain said clamp structure in the open position thereof, said trigger being engageable with said flap wire to constrain the same in its set position in which said clamp structure is maintained in its open position.

5. The trap of claim 4 in which said clamp structure further includes an elongated member of generally U-shaped configuration pivotally supported adjacent the closed end of said chamber for swinging movements therein between an open set position and a closed release position, said elongated member being connected with said U-shaped member so as to be controlled thereby and moved between open and closed positions substantially concurrently therewith.

6. The trap of claim 5 in which said ventilation openings are in said end wall, and in which said means for obstructing the admission of light through said openings comprises shade structure overhanging the same and secured to said casing.

7. The trap of claim 6 in which said ventilation openings comprises a plurality of spaced apart apertures adjacent the upper end of said end wall, and in which said shade structure extends downwardly and outwardly in overhanging relation with said apertures.

8. The trap of claim 7 in which each of the spaced legs of said U-shaped member is deformed intermediate the ends thereof to define an abutment, and in which said elongated member extends through said U-shaped member and is selectively engageable with the abutments thereof so as to be displaced thereby toward its open position and with the crossbar of said U-shaped member so as to be displaced thereby toward its closed position.

9. The trap of claim 3 in which said clamp structure further includes an elongated member of generally U-shaped configuration pivotally supported adjacent the closed end of said chamber for swinging movements therein between an open set position and a closed release position, said elongated member being connected with said U-shaped member so as to be controlled thereby and moved between open and closed positions substantially concurrently therewith.

10. The trap of claim 9 in which each of the spaced legs of said U-shaped member is deformed intermediate the ends thereof to define an abutment, and in which said elongated member extends through said U-shaped member and is selectively engageable with the abutments thereof so as to be displaced thereby toward its open position and with the crossbar of said U-shaped member so as to be displaced thereby toward its closed position.

References Cited
UNITED STATES PATENTS

| | | | |
|---|---|---|---|
| 807,969 | 12/1905 | Shelley | 43—86 |
| 872,041 | 11/1907 | Armstrong et al. | 43—86 |
| 1,366,995 | 2/1921 | Wolfe | 43—86 |

WARNER H. CAMP, Primary Examiner